United States Patent
El-Azzami et al.

(10) Patent No.: US 12,490,095 B2
(45) Date of Patent: Dec. 2, 2025

(54) OBTAINING LOCATION DATA FOR DATA PROCESSING SYSTEMS USING OUT-OF-BAND COMPONENTS

(71) Applicant: Dell Products L.P., Round Rock, TX (US)

(72) Inventors: Bassem El-Azzami, Austin, TX (US); Abeye Teshome, Austin, TX (US); Richard M. Tonry, Georgetown, TX (US); Mohit Arora, Frisco, TX (US); Adolfo Sandor Montero, Pflugerville, TX (US); Vinodkumar Vasudev Ottar, Mckinney, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/425,241

(22) Filed: Jan. 29, 2024

(65) Prior Publication Data
US 2025/0247703 A1    Jul. 31, 2025

(51) Int. Cl.
*H04W 12/104*   (2021.01)
*H04W 12/037*   (2021.01)

(52) U.S. Cl.
CPC ....... *H04W 12/104* (2021.01); *H04W 12/037* (2021.01)

(58) Field of Classification Search
CPC .......................... H04W 12/104; H04W 12/037
See application file for complete search history.

(56) References Cited

U.S. PATENT DOCUMENTS

| | | |
|---|---|---|
| 8,042,182 B2 | 10/2011 | Milani Comparetti et al. |
| 8,615,785 B2 | 12/2013 | Elrod et al. |
| 8,924,620 B2 | 12/2014 | Harriman et al. |

(Continued)

FOREIGN PATENT DOCUMENTS

WO    2024102715 A1    5/2024

OTHER PUBLICATIONS

A. Herborn et al. ("Identity Location Decoupling in Pervasive Computing Networks", Mar. 2005, 19th International Conference on Advanced Information Networking and Applications, vol. 1, pp. 610-615 (Year: 2005).*

*Primary Examiner* — Kenneth W Chang
(74) *Attorney, Agent, or Firm* — WOMBLE BOND DICKINSON (US) LLP

(57) ABSTRACT

Methods and systems for managing a data processing system are disclosed. To manage the data processing system, a management controller of the data processing system may obtain location data for the data processing system via an out-of-band communication channel. The location data for the data processing system may include different types of location data obtained via different location generation sources. The management controller may identify whether the different types of location data are consistently reporting location status of the data processing system. If the location data is determined to be consistent, then the management controller may provide a location report based on the location data using the out-of-band communication channel to a server to update a location status of the data processing system.

20 Claims, 5 Drawing Sheets

(56) References Cited

U.S. PATENT DOCUMENTS

| | | |
|---|---|---|
| 9,215,244 B2 | 12/2015 | Ayyagari et al. |
| 9,529,602 B1 | 12/2016 | Swierk |
| 9,734,169 B2 | 8/2017 | Redlich et al. |
| 10,176,308 B2 | 1/2019 | Mintz et al. |
| 10,298,670 B2 | 5/2019 | Ben-Shaul et al. |
| 10,671,765 B2 | 6/2020 | Swierk et al. |
| 11,036,902 B2 | 6/2021 | Nicholas |
| 11,102,122 B2 | 8/2021 | Seed et al. |
| 11,134,380 B2 | 9/2021 | Fox et al. |
| 11,487,274 B2 | 11/2022 | Valder et al. |
| 11,792,267 B2 | 10/2023 | Kreiner et al. |
| 2002/0025814 A1* | 2/2002 | Murai .................. H04W 8/04 455/435.2 |
| 2007/0136580 A1* | 6/2007 | Anand ................ H04L 9/0897 713/168 |
| 2011/0087387 A1 | 4/2011 | Safa-Bakhsh et al. |
| 2012/0266259 A1 | 10/2012 | Lewis |
| 2013/0019239 A1 | 1/2013 | Fontignie |
| 2013/0305357 A1 | 11/2013 | Ayyagari |
| 2014/0108789 A1* | 4/2014 | Phatak ................ H04L 63/0823 713/168 |
| 2014/0304497 A1 | 10/2014 | Park |
| 2015/0208195 A1* | 7/2015 | Kariman ................ H04W 4/02 455/456.1 |
| 2016/0036628 A1* | 2/2016 | Gupta .................... H04W 4/70 455/420 |
| 2016/0381146 A1* | 12/2016 | Zhang ................ H04L 67/141 709/228 |
| 2017/0357515 A1 | 12/2017 | Bower, III |
| 2018/0039946 A1 | 2/2018 | Bolte et al. |
| 2018/0082065 A1 | 3/2018 | Liu |
| 2018/0137284 A1 | 5/2018 | Oh |
| 2019/0090085 A1 | 3/2019 | Masterson |
| 2020/0337162 A1* | 10/2020 | Perkins .................. G04G 17/04 |
| 2021/0034048 A1 | 2/2021 | Hajizadeh |
| 2021/0073211 A1 | 3/2021 | Wright, Sr. |
| 2021/0266370 A1* | 8/2021 | Scarborough ...... G06Q 30/0605 |
| 2021/0397716 A1 | 12/2021 | Kovah |
| 2022/0038659 A1 | 2/2022 | Michel |
| 2022/0092193 A1 | 3/2022 | Nijasure |
| 2022/0092203 A1 | 3/2022 | Khatri |
| 2023/0246827 A1 | 8/2023 | Luciani, Jr. |
| 2024/0411637 A1 | 12/2024 | Lee |
| 2025/0245353 A1 | 7/2025 | Montero |

\* cited by examiner

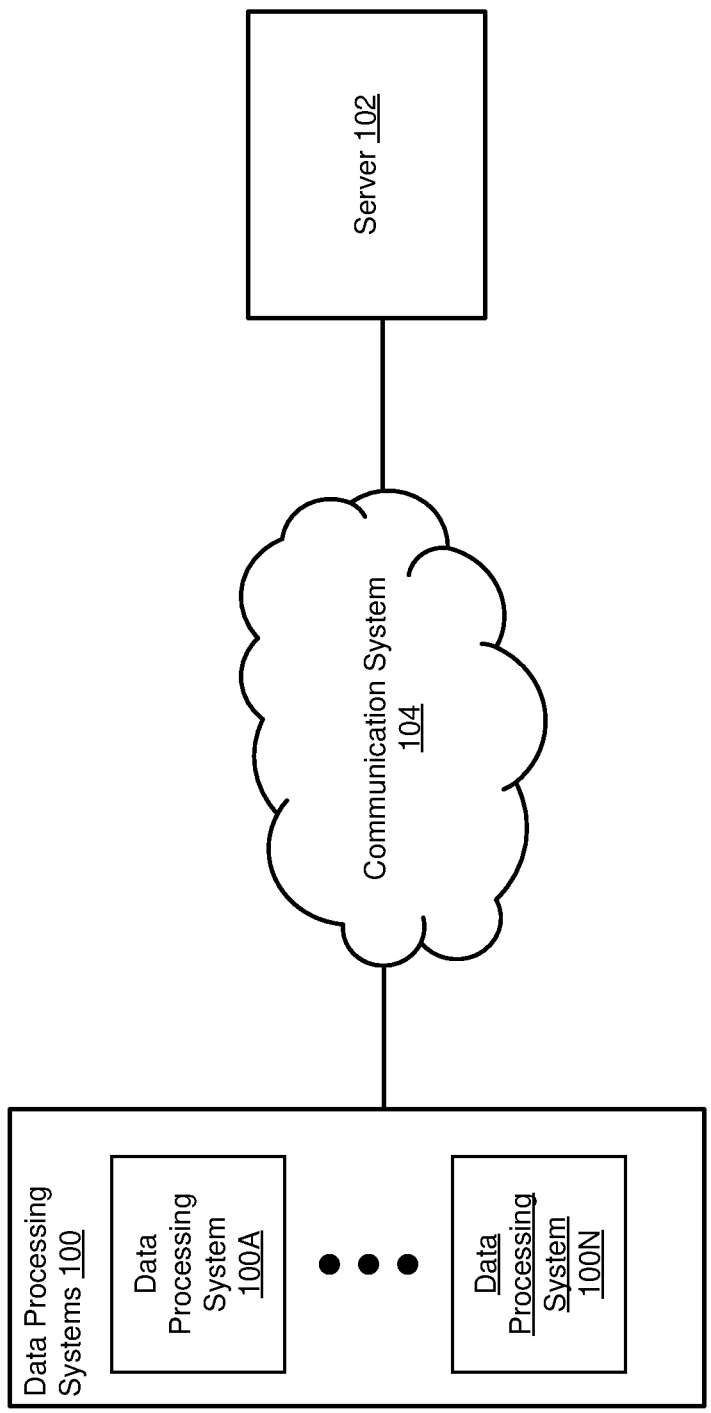

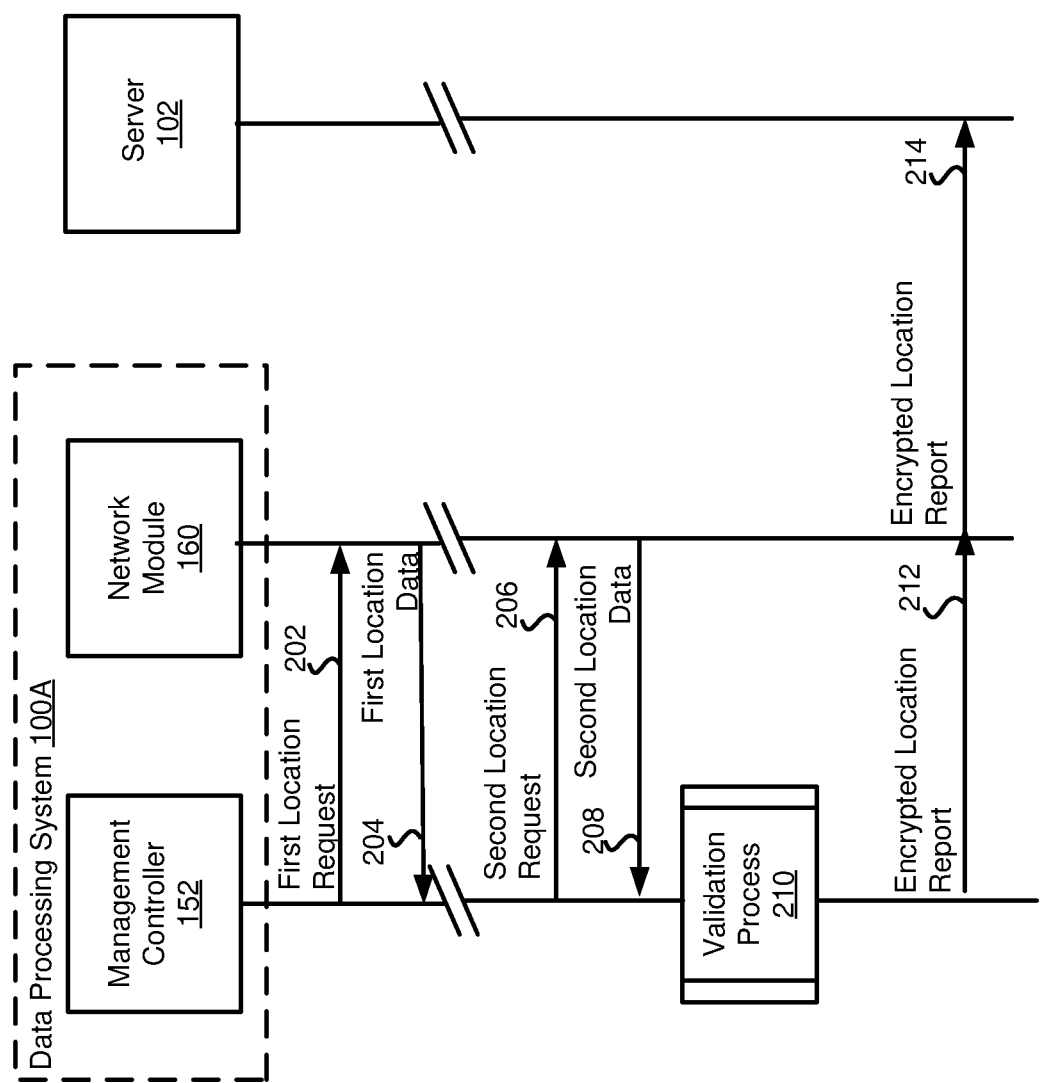

OBTAINING LOCATION DATA FOR DATA PROCESSING SYSTEMS USING OUT-OF-BAND COMPONENTS

FIELD

Embodiments disclosed herein relate generally to managing a data processing system. More particularly, embodiments disclosed herein relate to systems and methods for obtaining location data using a management controller of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1A shows a block diagram illustrating a system in accordance with an embodiment.

FIG. 2 shows a data flow diagram illustrating a first data flow in accordance with an embodiment.

DETAILED DESCRIPTION

Figure 1B:
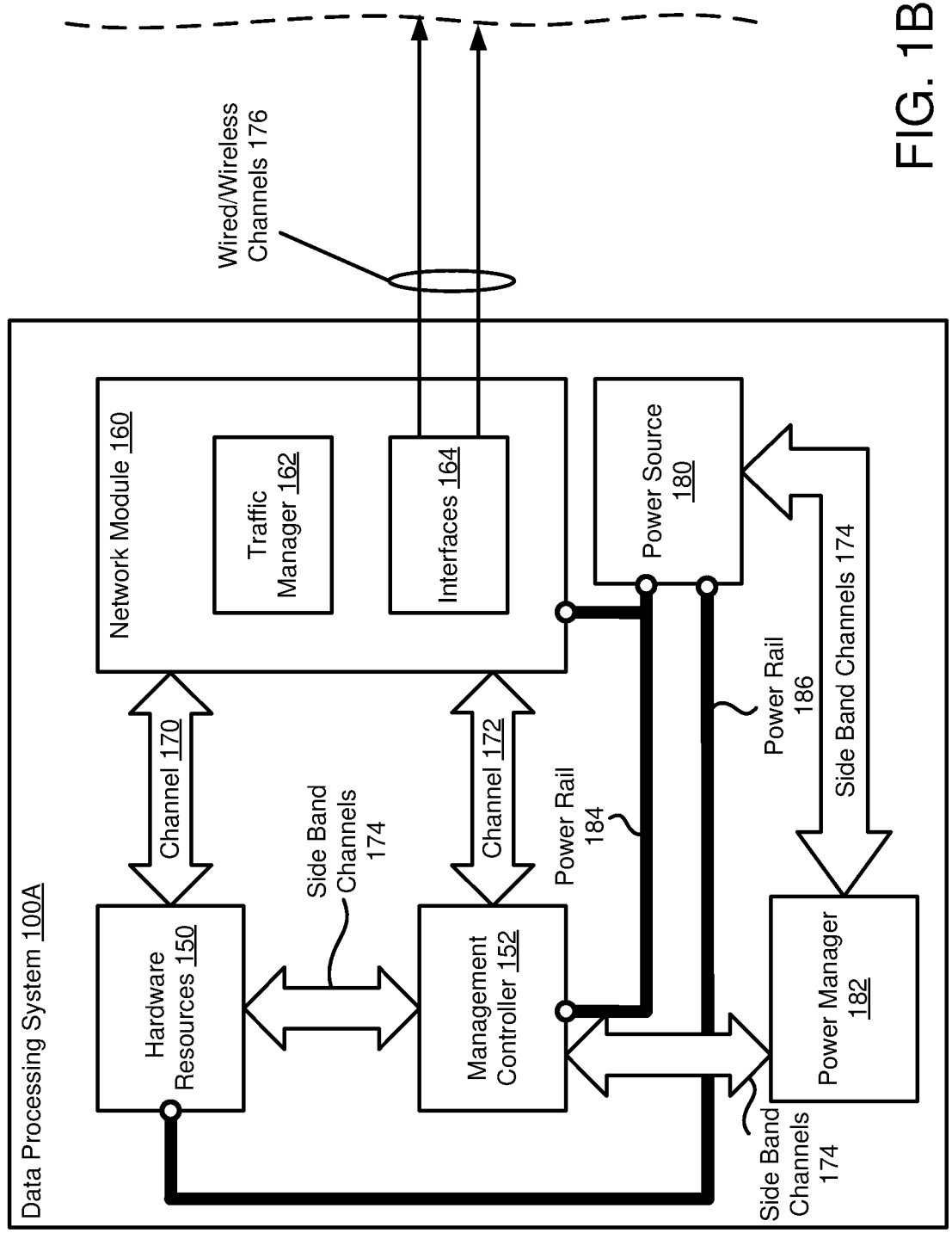
FIG. 1B shows a second block diagram illustrating a data processing system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing a data processing system. The data processing system may provide computer-implemented services that may vary depending on the physical location of the data processing system. The computer-implemented services may, for example, be provided based on an associated geographical location (e.g., location data) in which the data processing system is present. The computer-implemented services provided may only be beneficial to a user (e.g., operating a data processing system) if the location data is of high quality and/or reliable. Therefore, to avoid negative consequences associated with unreliable location data, operation of the data processing system (e.g., and therefore the computer-implemented services) may be managed based on a verified physical location of the data processing system.

To do so, a data processing system may include hardware resources (e.g., in-band components of the data processing system) that may transmit location data over a communication network such as a Wi-Fi network. For example, the data processing system may include a portable device, and the location data reported by the data processing system may be used to track the location of the data processing system as it is relocated over time.

However, the data processing system may, for various reasons, become unable to provide location data that is reliable (e.g., trustworthy, accurate, up to date, etc.). For example, hardware resources of the data processing system may become unpowered for periods of time, may be unable to connect to a communication network, and/or may become compromised by a malicious party (e.g., that may tamper with the location data). If reliable location data for the data processing system is unavailable, then the operation of the data processing system (e.g., computer-implemented services provided by the data processing system) may not be properly managed. For example, when improperly managed, the operation of the data processing system may be more likely to violate applicable policies, which may result in legal liabilities, penalties, inadvertent exposure of sensitive data, etc.

Thus, to increase the likelihood of the data processing system operating in compliance with applicable policies, location data for the data processing system may be managed using out-of-band methods. The location data may be generated and/or obtained using out-of-band components (and/or via out-of-band communication channels) that function independently from in-band components (e.g., hardware resources) of the data processing system. Consequently, if in-band components and/or in-band communication channels are compromised or non-operational, then the location data provided using out-of-band methods may remain available and reliable.

By doing so, embodiments disclosed herein may provide a system for managing (operation of) a data processing system based on verified location data of the data processing system. To do so, the data processing system may include out-of-band components such as a management controller. The management controller may, for example, obtain different types of location data usable to identify inconsistencies in a location status of the data processing system and/or may perform an action set based on the identified inconsistencies in order to manage an impact of the identified inconsistencies. If the location data of the data processing system is determined to be consistent, the management controller may obtain a secured location report using a private key of a public private key pair and may provide the secured location report to an external server via the out-of-band communication channel. Once the server receives the secured location report, a likelihood that the data processing system may provide more desirable computer-implemented services (e.g., secured, uninterrupted, etc.) may be increased.

In an embodiment, a method for managing a data processing system is provided. The method may include obtaining, by a management controller of the data processing system and via an out-of-band communication channel, first location data for the data processing system; performing, by the management controller, a comparison process using the first location data and second location data to determine whether the first location data is consistent with the second location data, the second location data being a different type of data than the first location data; in a first instance of the comparison process in which the first location data is determined to be consistent with the second location data: obtaining, by the management controller and using at least a private key of a public private key pair, a location report based on the first location data and the second location data; providing, by the management controller and via the out-of-band communication channel, the location report to a server to update a location status of the data processing system; and performing computer-implemented services based at least in part on the updated location status of the data processing system.

Performing the comparison process may include: obtaining, by the management controller and via the out-of-band communication channel, the second location data for the data processing system; and making a determination, based on the first location data and the second location data, regarding whether a difference between the first location data and the second location data falls within a threshold.

The first location data may be consistent with the second location data when the difference between the first location data and the second location data falls within the threshold.

The second location data may be based on at least one selected from a list consisting of: cellular technology; and wireless network protocols.

The first location data may be based on at least a global navigation satellite system.

Obtaining the location report may include signing, using the private key, a data package comprising at least the first location data to generate the location report.

The first location data and the second location data may be provided to the management controller by a network module of the data processing system via the out-of-band communication channel.

The network module may be adapted to separately advertise network endpoints for the management controller and hardware resources of the data processing system, the network endpoints may be usable by the server to address communications to the hardware resources using an in-band communication channel and the management controller using the out-of-band communication channel.

The management controller and the network module may be on separate power domains from the hardware resources so that the management controller and the network module may be operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, server 102, and/or any other type of devices (not shown in FIG. 1A). Other types of computer-implemented services may be provided by the system shown in FIG. 1A without departing from embodiments disclosed herein.

Providing the computer-implemented services may include utilizing location data of a data processing system of data processing systems 100 (e.g., 100A). For example, a computer-implemented service provided by data processing system 100A may depend on the physical location of data processing system 100A.

Thus, operation of and/or computer-implemented services provided by a data processing system (e.g., of data processing systems 100) may be modified (e.g., limited) based on the location of the data processing system. However, location data provided by hardware resources of the data processing system used to determine the location of the data processing system may be unreliable and/or untrustworthy, which may result in undesirable impacts to the computer-implemented services.

For example, the location data may be unreliable and/or untrustworthy when (i) the hardware resources may become unpowered while the data processing system is in transit to a new location (e.g., unintentionally, or intentionally by a malicious party intending to conceal the new location of the data processing system), (ii) the hardware resources may be compromised (e.g., by a malicious party intending to spoof the location), (iii) the hardware resources may lack connection to a network used to establish in-band communication channels for transmitting location data to other devices, and/or (iv) the data processing system is otherwise unable to provide location data that accurately reflects the (current) location of the data processing system.

In general, embodiments disclosed herein may provide methods, systems, and/or devices for managing operation of a data processing system based on location data. The data processing system may include out-of-band components that may communicate with one another without traversing in-band communication channels and without utilizing in-band components. For example, the out-of-band components may manage location data for the data processing system. By doing so, potentially compromised or inoperable in-band components may be circumvented, decreasing the likelihood of the location data becoming compromised (e.g., unreliable) and/or increasing the likelihood of the data processing system providing desirable computer-implemented services to a user (e.g., operating the data processing system).

To perform the above-mentioned functionality, the system of FIG. 1A may include data processing systems 100, and/or server 102. Data processing systems 100, server 102, and/or any other type of devices not shown in FIG. 1A may perform all, or a portion of the computer-implemented services independently and/or cooperatively. Each of these components is discussed below.

Data processing systems 100 may include any number and/or type of data processing systems (e.g., 100A-100N). Data processing systems 100 may provide computer-implemented services according to their physical location. To do so, data processing systems 100 may include out-of-band components (e.g., a network module, a management controller, etc.), and functionality that may allow data exchange between the out-of-band components independently from in-band components of data processing systems 100. For more information regarding out-of-band components of data processing systems 100, refer to the discussion of FIG. 1B.

For example, the out-of-band components of data processing systems 100 may (i) manage location data for data processing systems 100, (ii) determine, based on the location data, whether the location status of data processing systems 100 is reliable (e.g., via identifying inconsistencies among the location data for the data processing system), (iii) perform actions (e.g., of an action set) based on the determination of whether the location data is consistent that may update operation of data processing systems 100 and/or (iv) perform other actions relating to facilitating data processing systems 100 providing desired computer-implemented services.

Server 102 may include any number and/or type of servers (e.g., other data processing systems, management systems, storage devices, user devices, etc.) that may provide computer-implemented services, such as location-based services. To perform its functionality, server 102 may communicate (e.g., exchange data) with the out-of-band components of data processing systems 100 using out-of-band communication channels. For example, server 102 may provide location-based services for data processing system 100A via a management controller of data processing system 100A (e.g., bypassing any in-band components of data processing system 100A).

To provide location-based services, server 102 may, for example, (i) provide location status requests to the management controller (e.g., via out-of-band communication channels), (ii) participate in authentication processes (e.g., in order to verify authenticity of devices such as data processing systems 100), (iii) receive location data for data processing systems 100 (e.g., secured location reports from management controllers via out-of-band communication channels), and/or (iv) perform other actions that may facilitate location-based services to be provided by data processing systems 100. Refer to FIG. 2 for additional information regarding obtaining secured location reports.

Thus, the operation of data processing systems 100 may be managed using out-of-band methods (e.g., using out-of-band components and via out-of-band communication channels). By doing so, the location data may be more likely to be reliable, malicious activity and/or operating malfunctions may be more likely to be managed in a timely manner, and/or data processing systems 100 may be more likely to provide the desired computer-implemented services.

Figure 3:
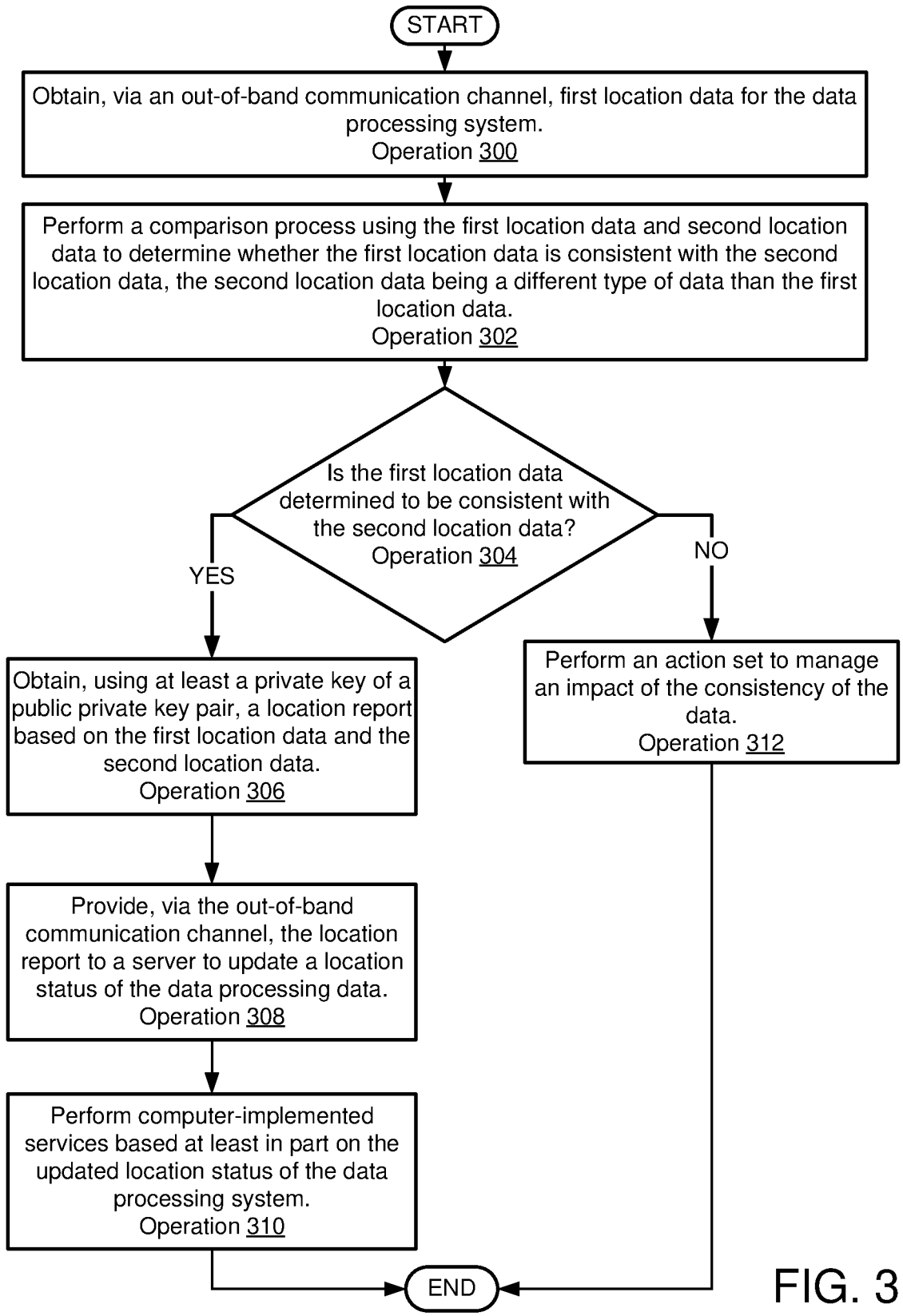
FIG. 3 shows a flow diagram illustrating a method of managing a data processing system in accordance with an embodiment.

When providing their functionality, any of data processing systems 100 and/or server 102 may perform all, or a portion of the methods shown in FIG. 3.

Any of (and/or components thereof) data processing systems 100 and/or server 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing systems 100 and/or server 102 are implemented using an internet of things (IoT) device, which may include a computing device. The IoT device may operate in accordance with a communication model and/or management model known to data processing systems 100, server 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 104 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single server (e.g., 102), it will be appreciated that the system may include any number of servers.

Turning to FIG. 1B, a diagram illustrating data processing system 100A in accordance with an embodiment is shown. Data processing system 100A may be similar to any of data processing systems 100 shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100A.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 100A may include management controller 152 and network module 160. Each of these components of data processing system 100A is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100A via separate channels (e.g., 172) from the in-band components.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100A.

To facilitate communication with other devices, data processing system 100A may include network module 160. Network module 160 may provide communication services for in-band components and out-of-band components (e.g., management controller 152) of data processing system 100A.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 140 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations described in FIG. 2.

While illustrated in FIG. 1B with a limited number of specific components, a system may include additional, fewer, and/or different components without departing from embodiments disclosed herein.

To further clarify embodiments disclosed herein, an interaction diagram in accordance with an embodiment is shown in FIG. 2. The interaction diagram may illustrate examples of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 152, 160, etc.), located towards the top of each figure. Lines descend from these shapes. Processes performed by the components of the system are illustrated using a second set of shapes (e.g., 210) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

Some of the lines descending from the first set of shapes are interrupted with line breaks. The line breaks may indicate, for example, a passage of time (e.g., between interactions and/or processes occurring above the line break and below other interactions and/or processes occurring below the line break), during which activity and/or events may occur.

The processes shown in FIG. 2 may be performed by any entity shown in the systems of FIGS. 1A-1B (e.g., a device similar to one of data processing system 100A, a server similar to server 102, etc.) and/or another entity without departing from embodiments disclosed herein.

Turning to FIG. 2, a first interaction diagram in accordance with an embodiment is shown. The first interaction diagram may illustrate processes and interactions that may occur during managing a data processing system. For example, data processing system 100A may include a portable device that may provide computer-implemented services. As discussed with respect to FIGS. 1A-1B, data processing system 100A may include hardware resources 150 (not shown), management controller 152, and network module 160. Over time, network module 160 may obtain location data usable to obtain a physical location of data processing system 100A. Management controller 152 may verify the location of data processing system 100A, which may include obtaining multiple location data (e.g., via different location generation sources) from network module 160.

At interaction 202, a first location request may be provided to network module 160 by management controller 152. For example, the first location request may be generated and provided to network module 160 via (i) transmission via a message, (ii) storing in a storage with subsequent retrieval by network module 160, (iii) via a publish-subscribe system where network module 160 subscribes to updates from management controller 152 thereby causing a copy of the first location request to be propagated to network module 160, and/or via other processes. By providing the first location request to network module 160, network module 160 may generate and/or otherwise obtain first location data for the data processing system 100A in response to the first location request.

The first location request may prompt network module 160 to obtain first location data for data processing system 100A (e.g., using a wireless wide area network (WWAN) connection facilitated by interfaces 164 of network module 160). Network module 160 may obtain the first location data in response to the first location request, which may include location data (e.g., coordinates, timestamp information, etc.) indicating a recent or current physical location for data processing system 100A. The first location data may include a first type of location data obtained using, for example, global navigation satellite systems (e.g., global positioning system).

At interaction 204, the first location data may be provided to management controller 152 by network module 160. For example, the first location data may be generated and provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the first location data to be propagated to management controller 152, and/or via other processes. By providing the first location data to management controller 152, management controller 152 may receive location data for the data processing system 100A in order to perform verification processes.

In order to perform validation process 210, management controller 152 may utilize multiple types of location data (e.g., indicating location of data processing system 100A) obtained from different sources in order to verify the reliability and quality of the location data. For example, management controller 152 may provide a second location request for second location data obtained from a different location-service sources compared to first location data.

At interaction 206, the second location request may be provided to network module 160 by management controller 152. For example, the second location request may be generated and provided to network module 160 via (i) transmission via a message, (ii) storing in a storage with subsequent retrieval by network module 160, (iii) via a publish-subscribe system where network module 160 subscribes to updates from management controller 152 thereby causing a copy of the second location request to be propagated to network module 160, and/or via other processes. By providing the second location request to network module 160, network module 160 may provide location gathering services for the data processing system 100A.

The second location request may prompt network module 160 to obtain second location data for data processing system 100A (e.g., using a wireless local area network "WLAN" connection facilitated by interfaces 164 of network module 160). The second location request may include a request to obtain location data (e.g., indicating a location of data processing system 100A) from a different source, for example, cell towers (e.g., via cell tower triangulation). Network module 160 may obtain the second location data in response to the second location request, which may include location data (e.g., coordinates, timestamp information, etc.) indicating a recent or current physical location for data processing system 100A. The second location data may include a second type of location data obtained using, for example, network-based location systems (e.g., Wi-Fi, cell tower triangulation, etc.).

At interaction 208, the second location data may be provided to management controller 152 by network module 160. For example, the first location data may be generated and provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the second location data to be propagated to management controller 152, and/or via other processes. By providing the second location data to management controller 152, management controller 152 may receive the second location data for the data processing system 100A in order to perform verification processes.

Management controller 152 may initiate validation process 210 based on the first location data and the second location data. For example, management controller 152 may determine whether the first location data of data processing system 100A is consistent with the second location data of data processing system 100A.

During validation process 210, the first location data and the second location data may be subjected to any type of comparison process to determine whether the first location data is consistent with the second location data. For example, management controller 152 may obtain the first location data and the second location data via an out-of-band communication channel of the data processing system and make a determination regarding whether a difference between the first location data and the second location data falls within a threshold.

The resulting determination may indicate the first location data is consistent with the second location data when the difference between the first location data and the second location data falls within the threshold. If the first location data is consistent with the second location data, then management controller 152 may generate a validated response in order to provide verified location data of the data processing system (e.g., 100A) to a server (e.g., server 102). The validated response may include, for example, (i) identifying information (e.g., for data processing system 100A and/or a user thereof), (ii) location data for (e.g., the physical location of) data processing system 100A, (iii) authentication information (e.g., usable to authenticate the location data of data processing system 100A), and/or (iv) any other information usable for providing secured (e.g., encrypted via a private public key) location data for data processing system 100A.

The validated location data may be used to generate an encrypted location report. To do so, management controller 152 may sign, using a private key of a public private key pair, the validated location data to obtain a cryptographically verifiable data structure.

At interaction 212, the encrypted location report may be provided by management controller 152 to network module 160 (e.g., via an side band communication channel) through (i) transmission via a message, (ii) storing in a storage with subsequent retrieval by network module 160, (iii) a publish-subscribe system where network module 160 subscribes to updates from management controller 152 thereby causing a copy of the encrypted location report to be propagated to network module 160, and/or (iv) other processes. The encrypted location report may be provided to network module 160 via an out-of-band communication channel similar to channel 172 described in FIG. 1B. By providing the encrypted location report to network module 160 via the out-of-band communication channel, the likelihood that the validated location data (e.g., included in the encrypted location report) may be protected, for example, from being potentially modified by an external entity or third party may be increased.

At interaction 214, the encrypted location report may be provided by network module 160 to server 102 (e.g., via an out-of-band communication channel) through (i) transmission via a message, (ii) storing in a storage with subsequent retrieval by server 102, (iii) a publish-subscribe system where server 102 subscribes to updates from network module 160 thereby causing a copy of the encrypted location report to be propagated to server 102, and/or (iv) other processes. By providing the encrypted location report to server 102, server 102 may manage location data for the data processing system in order to provide computer-implemented services.

While illustrated in FIG. 2 as including a single network module, it may be appreciated that data processing system 100A may include separate network modules that may be used by separate components of data processing system 100A. For example, out-of-band communications may be obtained by a first network module and in-band communications may be obtained by a second network module. The encrypted location reports may be aggregated from these separate network modules, or they may come from one network module via the out-of-band communication channel.

Server 102 may complete validation process 210 by, for example, obtaining the encrypted location report, and performing actions indicated by instructions included in the encrypted location report that may update the validated location data and/or configuration settings of data processing system 100A. For example, server 102 may store the validated location data, the additional information related to the validated location data, and/or other information included in the validated location data. Server 102 may access the validated location data (and other stored information) during other processes that may be performed to improve accuracy of the validated location data of data processing system 100A when providing computer-implemented services.

Thus, as shown in the example of FIG. 2, a data processing system may manage and/or verify its location data using out-of-band methods. For example, the location data may be generated and obtained from multiple geolocation sources (e.g., global navigation satellite system, cellular technology, etc.) via out-of-band communication channels. By avoiding in-band communication methods and using multiple location sources, the location data that may be reported to a server, for example, may be more likely to be reliable and trusted for use in managing the operation of the data processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2 may perform various methods to improve accuracy of location reporting of data processing systems using out-of-band communication methods. By using out-of-band communication methods to obtain and provide location data, the data processing systems may be more likely to provide secure and reliable computer-implemented services.

FIG. 3 illustrates a method that may be performed by the components of the system of FIGS. 1A-2. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system and/or another device.

Turning to FIG. 3, a flow diagram illustrating a method of managing a data processing system in accordance with an embodiment is shown. The method may be performed, for example, by a data processing system, a management system, a communication system, a management controller, hardware resources, and/or other components illustrated in FIGS. 1A-2.

At operation 300, first location data for a data processing system may be obtained. The first location data may be obtained via out-of-band communication channel using methods described with respect to FIG. 2 and/or by other out-of-band communication methods. For example, to avoid using any potentially unavailable hardware resources (e.g., in-band components) of the data processing system, the first location data may be obtained by a network module of the data processing system and/or may be provided (e.g., transmitted) to the management controller via the out-of-band communication channel. The first location data may indicate a location of the data processing system based on at least a global navigation satellite system.

At operation 302, a comparison process using the first location data and second location data may be performed. The comparison process may be performed by (i) obtaining, via the out-of-band communication channel, the second location data for the data processing system, (ii) obtaining a difference between the first location data and the second location data, and/or (iii) by any other methods.

At operation 304, a determination may be made regarding whether the first location data is consistent with the second location data. The determination may be facilitated by (i) obtaining a threshold indicating an acceptable range for the difference between the first location data and the second location data in order for the first location data to be consistent with the second location data, and (ii) comparing the difference obtained in operation 302 to the threshold to identify whether the first location data is consistent with the second location data. If the first location data is not consistent with the second location data (e.g., the determination is "No" at operation 304), then the method may proceed to operation 312.

At operation 312, an action set to manage an impact of the consistency of the data may be performed. The action set may be performed by (i) identifying whether the inconsistency of the location data (e.g., the first location data and the second location data) is a result of malicious activity, (ii) if malicious activity is confirmed, then performing defensive activities to limit the functionality of the data processing system 100A (e.g., reporting erroneous location data for data processing system 100A), thereby preventing data processing system 100A from being further compromised.

In an embodiment, if the inconsistency of the location data is not a result of malicious activity, the action set may include performing diagnostic routines to identify malfunction of activities by data processing system 100A, and performing restorative actions to address the diagnosed malfunction. For example, management controller 152 of data processing system 100A may perform diagnostic testing on the components of data processing system 100A and determine an operating malfunction by one of the components (e.g., network module 160). Based on the identified malfunction, management controller 152 may perform restorative actions to address the operating malfunction.

Returning to operation 304, if the first location data is determined to be consistent with the second location data (e.g., the determination is "Yes" at operation 304), then the method may proceed to operation 306.

At operation 306, a location report may be obtained. The location report may be obtained using at least a private key of a public private key pair. The location report may be based on the first location data and the second location data. The location report may be obtained by signing, using the private key, a data package comprising at least the first location data to generate the location report.

At operation 308, the location report may be provided to a server to update a location status of the data processing system. The location report may be provided by the management controller and via the out-of-band communication channel.

At operation 310, computer-implemented services may be performed. The computer-implemented services may be performed based at least in part on the updated location status of the data processing system. The computer-implemented services may be more likely to include desired (e.g., secure and/or verified location data) computer-implemented services when performed using the updated location status of the data processing system. For example, the data processing system may provide a computer-implemented service by receiving more reliable inputs from a server (e.g., by utilizing the updated location data) and initiating updated functionality of the hardware resources based on the inputs.

The method may end following operation 310.

Using the methods illustrated in FIG. 3, embodiments disclosed herein may provide systems and methods usable to manage data processing systems by verifying location status of the data processing systems using different types of location sources obtained and provided via out-of-band communication methods. By managing the location data without relying on in-band communication methods, the likelihood of the location data being modified, leaked, and/or otherwise compromised may be reduced and the likelihood of providing consistent location status of data processing systems may be increased. By providing consistent location status of data processing systems, computer-implemented services provided by the data processing systems may be more likely to be desirable.

Figure 4:
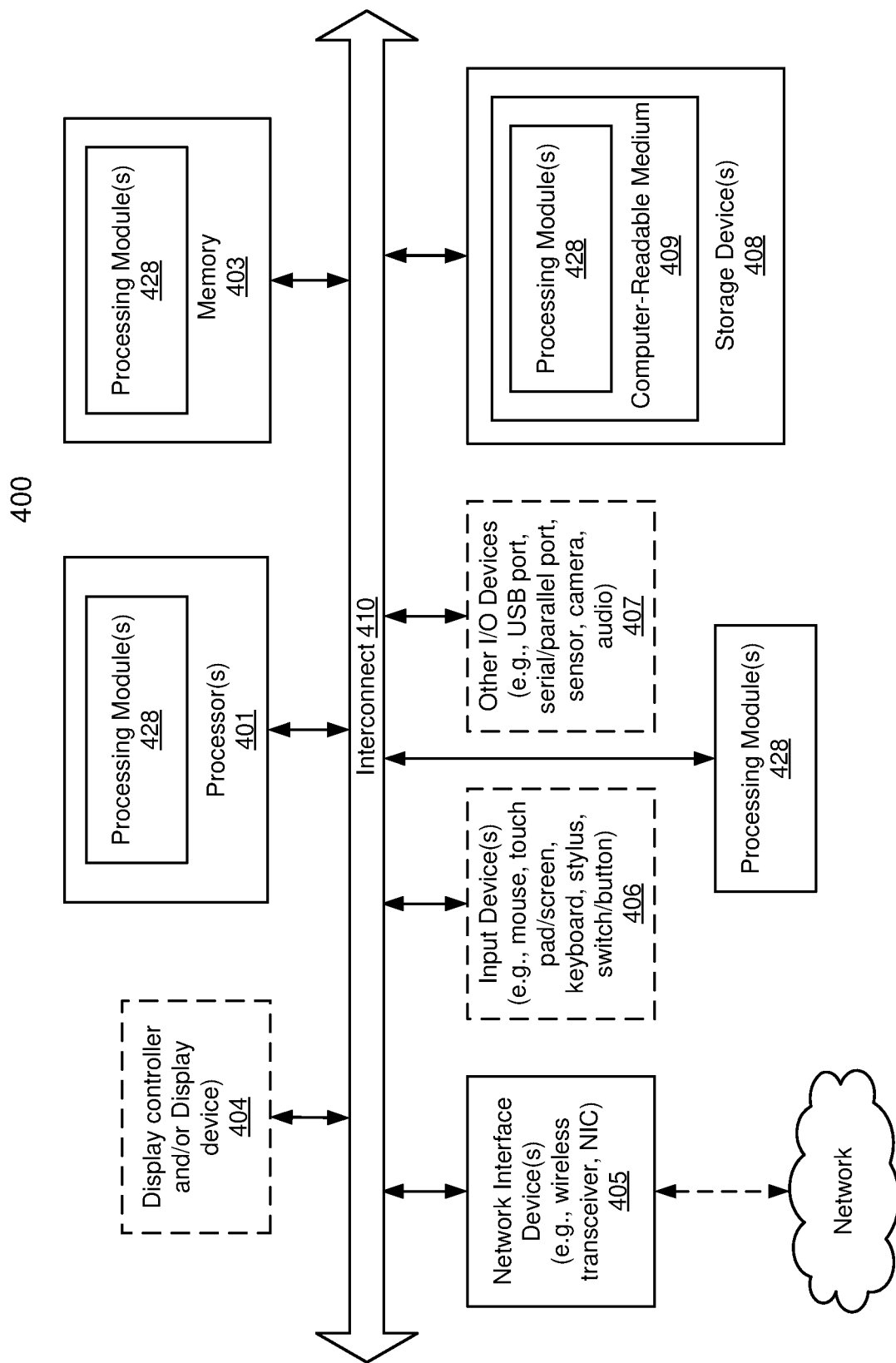
FIG. 4 shows a block diagram illustrating a data processing system in accordance with an embodiment.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing a data processing system, the method comprising:

obtaining, by a management controller of the data processing system and via an out-of-band communication channel, first location data for the data processing system;

performing, by the management controller, a comparison process using the first location data and second location data to determine whether the first location data is consistent with the second location data, the second location data being a different type of data than the first location data, the first location data and the second location data are provided to the management controller by a network module of the data processing system via the out-of-band communication channel, the network module is adapted to separately advertise network endpoints for the management controller and hardware resources of the data processing system, and the network endpoints being usable by a server to address communications to the hardware resources using an in-band communication channel and the management controller using the out-of-band communication channel;

in a first instance of the comparison process in which the first location data is determined to be consistent with the second location data:

obtaining, by the management controller and using at least a private key of a public private key pair, a location report based on the first location data and the second location data;

providing, by the management controller and via the out-of-band communication channel, the location report to a server to update a location status of the data processing system; and performing computer-implemented services based at least in part on the updated location status of the data processing system.

2. The method of claim 1, wherein performing the comparison process comprises:

obtaining, by the management controller and via the out-of-band communication channel, the second location data for the data processing system; and making a determination, based on the first location data and the second location data, regarding whether a difference between the first location data and the second location data falls within a threshold.

3. The method of claim 2, wherein the first location data is consistent with the second location data when the difference between the first location data and the second location data falls within the threshold.

4. The method of claim 1, wherein the second location data is based on at least one selected from a list consisting of:

cellular technology; and wireless network protocols.

5. The method of claim 2, wherein the first location data is based on at least a global navigation satellite system.

6. The method of claim 1, wherein obtaining the location report comprises:

signing, using the private key, a data package comprising at least the first location data to generate the location report.

7. The method of claim 1, wherein the management controller and the network module are on separate power domains from the hardware resources so that the management controller and the network module are operable while the hardware resources are inoperable.

8. The method of claim 1, wherein the out-of-band communication channel runs through the network module, and an in-band communication channel that services the hardware resources also runs through the network module.

9. The method of claim 1, wherein the network module hosts a transmission control protocol/internet protocol (TCP/IP) stack to facilitate network communications via the out-of-band communication channel.

10. A non-transitory machine-readable medium having instructions stored therein, which when executed by a processor, cause operations for managing a data processing system to be performed, the operations comprising:
obtaining, by a management controller of the data processing system and via an out-of-band communication channel, first location data for the data processing system;
performing, by the management controller, a comparison process using the first location data and second location data to determine whether the first location data is consistent with the second location data, the second location data being a different type of data than the first location data, the first location data and the second location data are provided to the management controller by a network module of the data processing system via the out-of-band communication channel, the network module is adapted to separately advertise network endpoints for the management controller and hardware resources of the data processing system, and the network endpoints being usable by a server to address communications to the hardware resources using an in-band communication channel and the management controller using the out-of-band communication channel;
in a first instance of the comparison process in which the first location data is determined to be consistent with the second location data:
obtaining, by the management controller and using at least a private key of a public private key pair, a location report based on the first location data and the second location data;
providing, by the management controller and via the out-of-band communication channel, the location report to a server to update a location status of the data processing system; and
performing computer-implemented services based at least in part on the updated location status of the data processing system.

11. The non-transitory machine-readable medium of claim 10, wherein performing the comparison process comprises:
obtaining, by the management controller and via the out-of-band communication channel, the second location data for the data processing system; and
making a determination, based on the first location data and the second location data, regarding whether a difference between the first location data and the second location data falls within a threshold.

12. The non-transitory machine-readable medium of claim 11, wherein the first location data is consistent with the second location data when the difference between the first location data and the second location data falls within the threshold.

13. The non-transitory machine-readable medium of claim 10, wherein the second location data is based on at least one selected from a list consisting of:
cellular technology; and
wireless network protocols.

14. The non-transitory machine-readable medium of claim 11, wherein the first location data is based on at least a global navigation satellite system.

15. The non-transitory machine-readable medium of claim 10, wherein the management controller and the network module are on separate power domains from the hardware resources so that the management controller and the network module are operable while the hardware resources are inoperable.

16. A data processing system, comprising:
a processor; and
a memory coupled to the processor to store instructions, which when executed by the processor, cause operations for managing a data processing system to be performed, the operations comprising:
obtaining, by a management controller of the data processing system and via an out-of-band communication channel, first location data for the data processing system;
performing, by the management controller, a comparison process using the first location data and second location data to determine whether the first location data is consistent with the second location data, the second location data being a different type of data than the first location data, the first location data and the second location data are provided to the management controller by a network module of the data processing system via the out-of-band communication channel, the network module is adapted to separately advertise network endpoints for the management controller and hardware resources of the data processing system, and the network endpoints being usable by a server to address communications to the hardware resources using an in-band communication channel and the management controller using the out-of-band communication channel;
in a first instance of the comparison process in which the first location data is determined to be consistent with the second location data:
obtaining, by the management controller and using at least a private key of a public private key pair, a location report based on the first location data and the second location data;
providing, by the management controller and via the out-of-band communication channel, the location report to a server to update a location status of the data processing system; and
performing computer-implemented services based at least in part on the updated location status of the data processing system.

17. The data processing system of claim 16, wherein performing the comparison process comprises:
obtaining, by the management controller and via the out-of-band communication channel, the second location data for the data processing system; and
making a determination, based on the first location data and the second location data, regarding whether a difference between the first location data and the second location data falls within a threshold.

18. The data processing system of claim 17, wherein the first location data is consistent with the second location data when the difference between the first location data and the second location data falls within the threshold.

19. The data processing system of claim 16, wherein the second location data is based on at least one selected from a list consisting of:
cellular technology; and wireless network protocols.

20. The data processing system of claim 16, wherein the management controller and the network module are on separate power domains from the hardware resources so that the management controller and the network module are operable while the hardware resources are inoperable.

\* \* \* \* \*